J. C. LINCOLN.
METHOD FOR UNITING RAILWAY RAILS.
APPLICATION FILED FEB. 6, 1914.
1,281,402.
Patented Oct. 15, 1918.
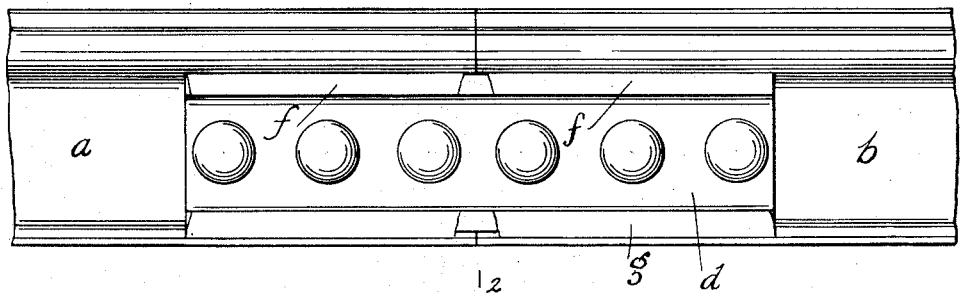
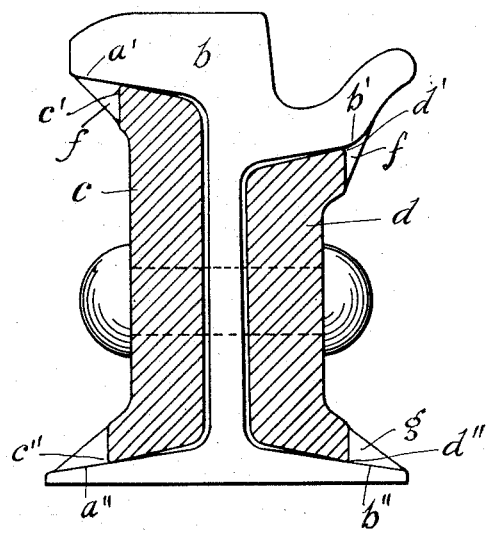
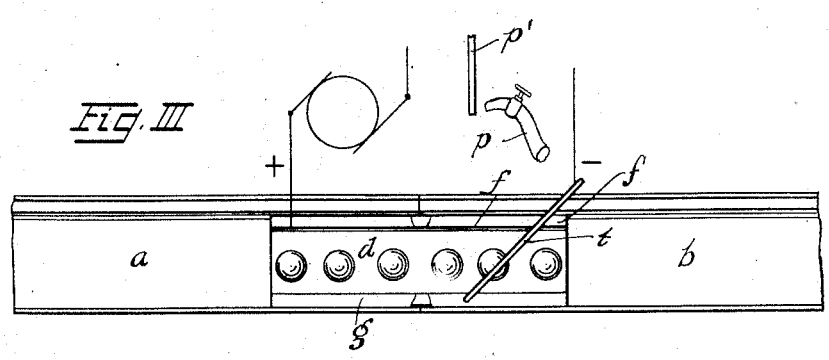
Witnesses:
F. C. Valentine
M. A. Driscoll
Inventor:
John C. Lincoln,
by his attorney.

UNITED STATES PATENT OFFICE.

JOHN C. LINCOLN, OF CLEVELAND, OHIO.

METHOD FOR UNITING RAILWAY-RAILS.

1,281,402.  Specification of Letters Patent.  Patented Oct. 15, 1918.

Application filed February 6, 1914. Serial No. 817,020.

*To all whom it may concern:*

Be it known that I, JOHN C. LINCOLN, a citizen of the United States, residing at Cleveland, in the county of Cuyahoga and State of Ohio, have invented certain new and useful Improvements in Methods for Uniting Railway-Rails, of which the following is a specification.

My invention relates to improvements in method for uniting railway rails, and has for its object the provision of a strong and cheap mechanical and electrical bond for the ends of such rails.

Numerous methods have previously been devised for uniting the ends of rails, of which the most modern and satisfactory at the present time, probably consists in casting or welding a bond of metal about the lower portion of the rail-ends which is adapted permanently and rigidly to secure the rails in their relative relation. As is well recognized, however, the uniting of the rail-ends by means of fish-plates, alone is a much cheaper method, although affording no satisfactory electric connection between the rails. In recent years, this method has been improved upon by riveting the fish-plates to the rail-ends by means of suitable pneumatic apparatus, which eliminates the chance for loosening the fish-plates.

My present method combines the unitary electrical and mechanical construction of the joint obtained by the method first described, while adding very little to the cost of uniting the rail-ends by means of bolted or riveted fish-plates. This method, in brief, consists in welding the edges of the fish-plates upon both sides of the rail-ends directly to the heads and flanges of said rails. This preferably is accomplished by means of the electric arc, and the expense is materially less than is entailed by the production of any other welded joint, securing equal strength and permanence.

My invention may be more readily explained by making reference to the accompanying drawings, wherein:—

Figure I is a fragmentary view of two rail-ends united by means of riveted fish-plates with longitudinal welds along the adjacent edges of the fish-plates and the rails, the welds being supplemented by separate, additional bodies of metal.

Fig. II is a vertical section on line 2—2 of Fig. 1.

Fig III is a diagram showing a side-elevation of the joint with the preferred welds indicated upon the rail-ends and fish-plates, the electrode or torch for effecting the weld, and the power-circuit for striking the welding arc.

Throughout the several figures of the drawings, I have employed the same character of reference to indicate similar parts.

The rail-ends $a$ $b$ are of any well-known type; being united by fish-plates $c$ $d$, which may be bolted or riveted upon the rail-ends, as has been commonly practised heretofore. Preferably, however, as the joint is sought to be made permanent, both mechanically and electrically, I advise power riveting the fish-plates upon the rail-ends.

Several considerations have determined the limited welding of the fish-plates to the rail-ends. Ordinarily, the work must be done after the rails have been spiked into place upon the road-bed. Depending upon the character of the rails, and the traffic, the welds may comprise welding seams or superadded bodies of metal reinforcing such seams. These welds, however, do not bridge the plane separating the rail-ends. Thus, one mode of practising my invention, after the fish-plates have been permanently secured upon the rail-ends, is to apply the negative terminal $t$ of an electric arc to the same between the tops and bottoms of each fish-plate, as $c'$, $d'$, and $c''$, $d''$, and the adjacent faces $a'$, $b'$, $a''$, $b''$, of the rails. The welded seams, $c'$, $d'$, along the tops of the fish-plates, however, may be omitted, provided the joint is not subjected to excessive strains.

The current ordinarily and preferably used is direct current, varying from two hundred to four hundred amperes, with the positive connection established upon the rail or fish-plate with which the weld is first made.

Obviously, my invention is not limited to electrically welding the fish-plates and rail-ends, since the oxy-hydrogen and acetylene blow-pipes may likewise be used for effecting the welds. In any case, a suitable heating flame (and by this term I mean to include the electric arc, as well) will fuse or weld the metal of the fish-plate directly to the outer faces of the rail-flanges, so that the structure is made unitary along the lines $c'$, $d'$, $c''$, $d''$. Inasmuch as only a relatively small body of metal is fused at one time, very little current and only a little time on the part of a workman of ordinary skill, are required to convert a rail-joint into one which is of such electrical and mechanical excellence that "breaking-down" tests develop the fact that the fish-plates will first yield under the strain, rather than the welded seams of the joints.

While the procedure just described is adapted for uniting rails of light construction, it is commonly found desirable to supplement the welded seams in uniting rails sustaining ordinarily heavy traffic. The principles as outlined, however, apply with equal force to the following explanation.

As is well known, the commercial fish-plates are adapted both by shape and mass to the weight or strength of the rail with which they are employed, and the drawings actually illustrate a relatively heavy street railway rail united by massive riveted fish-plates. After the rails a, b, have been secured closely in engagement by means of the riveted fish-plates c, d, a metallic electrode t, preferably of steel, is applied as the negative terminal of the arcing circuit, while the rails and fish-plates form the positive side of the circuit, as previously described.

Those conversant with the art will understand that the negative metallic terminal will be melted at the tip and when applied to the seams between the tops and bottoms of the fish-plates and the adjacent faces a', b', of the rails, the metal of the electrode will be welded into that of the fish-plates and rails, so that an appreciable body of additional metal will be supplied thereto. It may be noted in passing that while desirable, it is not necessary in using a metallic electrode, to have it form the negative terminal of the arcing circuit, since it will be melted in either instance.

In order properly to distribute the strain for the relatively light welds, the arc is applied upon either side of the vertical plane 2—2 supporting the rail-ends, so that the actual welds are marked by sections f, g, which lie approximately a quarter of an inch back upon either side of said plane separating the rail-ends. I have found that by sub-dividing the welds in this manner, that breaking-down tests do not initially develop cracks in the fish-plates along the line of said vertical plane, and the strains, as a result of this construction, are shearing strains.

If the acetylene torch "p" is to be used in practising this process, it is merely necessary to employ a small bar of steel p', from which the welded bodies may be melted as the welding operation proceeds between the fish-plate and the rail; otherwise the process is identical with the described use of the electric current for the same purpose.

While I have referred to and described the precautionary welding of the upper edges of the fish-plates to the under faces of the rail-heads, I may explain that this is not absolutely essential, inasmuch as the strains incident to the supported weight primarily are borne by the lower welds or welded bodies g, while the upper welds or welded bodies f serve primarily to resist the contractile strains incident to the lowering in temperature of long lengths of welded rails. Of course, in speaking of the resistance to strain, all of the welded seams serve to supplement the strength and resistance of the fish-plates. By separating or subdividing the welds or welded seams, however, it is apparent that the total strain is resisted by the entire length of the welds, instead of by the relatively small cross-section which otherwise would bridge the slight gap between the rail-ends.

Positioned as are these seams or welds g, along the lower edges of the fish-plates, it will be appreciated that these welded joints are subjected essentially to shearing strains, while the compression resulting from the sustained weight or shock is taken by the upper portions of the heads of abutting rail-ends. No proportionate increase in efficiency, so far as the supported weight is concerned, is obtained by welding the upper edges of the fish-plates to the heads of the rails, and accordingly, these welds may frequently be dispensed with. My improvement essentially provides a method of increasing the strength of the rail-joint materially against bending or shearing strains throughout properly localized areas, by dropping relatively ductile molten metal upon the seams or sectional welds, while incidentally decreasing the electrical resistance of said rail-joint.

Having now described the preferred method of practising my invention, I claim as new and desire to secure by Letters Patent, the following:—

1. The herein described method for electrically and mechanically uniting railway rails, which consists in riveting fish-plates to the rail-ends positioned in alinement and closely abutting each other, and applying the negative terminal of an electric arc to the lower adjacent surfaces or seams between the fish-plates and the flanges of said rails to effect surface fusion or welds therebetween respectively separated at the meeting plane of the rail ends, substantially as set forth.

2. The method for uniting railway rails substantially as herein described, which consists in riveting fish-plates to the rail-ends as positioned for use, and thereafter welding only the lower edges of the fish-plates to the rails; interrupting the welding operation immediately adjacent to the meeting plane of said rails.

3. The herein described method of uniting rail-ends, which consists in placing the rails in alinement with fish-plates embracing the webs thereof at their ends, and forming interrupted seams or welds by dropping molten metal upon the abutting edges of the fish-plates in the presence of a heating flame to effect surface welds upon either side of the meeting plane of the rail-ends, substantially as set forth.

In testimony whereof I do now affix my signature in the presence of two witnesses.

JOHN C. LINCOLN.

Witnesses:
  M. A. DRISCOLL,
  ALBERT LYNN LAWRENCE.